(12) United States Patent
Vion

(10) Patent No.: US 6,210,587 B1
(45) Date of Patent: Apr. 3, 2001

(54) METHOD FOR THE PHYSICO-CHEMICAL TREATMENT OF EFFLUENTS, IN PARTICULAR OF SURFACE WATER FOR CONSUMPTION

(75) Inventor: Patrick Vion, Houilles (FR)

(73) Assignee: Degremont, Malmaison (FR)

( * ) Notice: Subject to any disclaimer, the term of this patent is extended or adjusted under 35 U.S.C. 154(b) by 0 days.

(21) Appl. No.: 09/341,714

(22) PCT Filed: Jan. 23, 1998

(86) PCT No.: PCT/FR98/00125

§ 371 Date: Jul. 16, 1999

§ 102(e) Date: Jul. 16, 1999

(87) PCT Pub. No.: WO98/32701

PCT Pub. Date: Jul. 30, 1998

(30) Foreign Application Priority Data

Jan. 27, 1997 (FR) .................................................. 97 00846

(51) Int. Cl.$^7$ ........................................................ C02F 1/52
(52) U.S. Cl. .......................... 210/711; 210/713; 210/714; 210/727
(58) Field of Search .................................... 210/710, 711, 210/713, 714, 715, 726, 727, 738

(56) References Cited

U.S. PATENT DOCUMENTS

| | | | |
|---|---|---|---|
| 3,350,302 | * 10/1967 | Demeter et al. | 210/711 |
| 4,388,195 | * 6/1983 | von Hagel | 210/709 |
| 4,927,543 | * 5/1990 | Bablon et al. | 210/711 |
| 4,997,573 | * 3/1991 | Browne | 210/714 |
| 5,730,864 | * 3/1998 | Delsalle et al. | 210/195.1 |
| 5,770,091 | * 6/1998 | Binot et al. | 210/711 |
| 5,800,917 | * 9/1998 | Ramsay et al. | 210/711 |
| 6,010,631 | * 1/2000 | Delsalle et al. | 210/713 |

* cited by examiner

*Primary Examiner*—Peter A. Hruskoci
(74) *Attorney, Agent, or Firm*—Connolly Bove Lodge & Hutz

(57) ABSTRACT

A process is disclosed for the physico-chemical treatment of effluent, especially surface water intended for consumption, the process includes the successive steps of coagulation, flocculation and settling, wherein, during the flocculation step, a ballast is introduced into the sludge, the function of which ballast is to make the sludge heavier. The contacting mass used during this flocculation step consists of part of the densified sludge resulting from the settling step and continuously recycled in the flocculation step, without any treatment.

8 Claims, 2 Drawing Sheets

METHOD FOR THE PHYSICO-CHEMICAL TREATMENT OF EFFLUENTS, IN PARTICULAR OF SURFACE WATER FOR CONSUMPTION

FIELD OF THE INVENTION

The present invention relates to a process for the physico-chemical treatment of effluent, especially of surface water intended for consumption.

BACKGROUND OF THE INVENTION

It is known that the use of physico-chemical processes is common to most treatments applied to various types of water and that these treatments essentially consist of:

clarification of surface water for consumption or for industry;

clarification of municipal sewage, storm water or industrial waste water;

decarbonization;

removal of phosphates;

etc.

These types of physico-chemical treatments always comprise the following successive steps:

coagulation: a step of neutralization of the colloids using a metal salt, generally a trivalent iron or aluminium compound, in order to form a microfloc.

This coagulation step may be carried out in one or more steps;

flocculation: a step of agglomeration and growth of the microfloc. This agglomeration step takes place by virtue of the addition of a polyelectrolyte (or polymer) downstream of the coagulation step;

settling: a step of separation of the floc from the interstitial water, causing the formation of sludge on the one hand, and of clarified water on the other hand.

Over the last thirty years or so, the state of the art relating to such a physico-chemical treatment has evolved considerably as a result of the appearance of two technologies:

flocculation with a contacting mass, which has allowed the quality of the flocs to be improved, the volume of the reactors to be reduced and the clarification to be improved. This is because the microflocs of the coagulation have a greater chance of agglomerating and of growing as the reaction medium contains a high density of particles: the rate of floc formation is proportional to the number of free particles in the suspension;

lamellar settling, carried out by introducing inclined plates or tubes in the settling tanks. This technology has made it possible to reduce the size of the settling tanks by from 50 to 70%

The current technological trend is towards improving the flocculation conditions, which are key in determining the quality of the treated water and in obtaining high settling velocities.

At the present time, modern settling tanks use two types of contacting masses in the flocculation reactor:

1. recirculated presettled sludge: an example of this technique is described in FR-A-2,553,082;

2. fine ballasts, such as microsand: an example of the use of this technique is described in FR-P-1,411,792 and in FR-A-2,627,704.

The advantages and disadvantages of the two known techniques indicated above, of flocculation with a contacting mass, will now be explained.

1. Flocculation Using Sludge as the Contacting Mass

FIG. 1 of the appended drawing shows diagrammatically a physico-chemical treatment plant employing this technique. This figure shows diagrammatically, at A, the coagulation reactor, at B, the flocculator and, at C, the settling tank. These are plants well known to those skilled in the art and, under these conditions, they will not be described.

Thus, as may be seen in this FIG. 1, the contacting mass in the flocculation reactor B consists of the recirculation of part of the sludge which has settled in C. The recirculated sludge volume represents between 0.5 and 4% of the treated volume. The excess, concentrated sludge is extracted and removed. Their volume represents between 0.1 and 1% of the treated volume, depending on the treatments.

The advantages of this flocculation technique using recirculated presettled sludge as the contacting mass are the following:

the contacting mass is generated by the process, and is therefore available without any quantity limitation, depending on the requirements of the process;

the contacting mass presents a very high specific surface area or spatial occupation because of its expanded structure and its low relative density; by way of example, 1 gram of flocculated sludge in one liter (average concentration in the reactor) occupies, after settling for approximately 5 minutes, a volume equal to 100 ml.

This very high specific surface area or spatial occupation considerably increases the probability of contact between the flocs and the very fine particles, coagulated colloids and micro-organisms, and therefore of "trapping" this suspended matter very efficiently.

The drawbacks and limitations of this technique involve the settling speeds obtained with densified sludges which are between 30% and 80% of the velocities obtained with ballast.

2. Flocculation Using a Ballast as the Contacting Mass

According to this technique, the contacting mass is obtained by adding, upstream of a flocculator, a fresh or recycled ballast after cleaning. The means making it possible to separate and regenerate the ballast which is to be recycled in the flocculator are means well known to those skilled in the art and, under these conditions, they will not be described.

When implementing this technique, the ballast generally consists of sand and the continuously extracted materials amount to approximately 5% of the volume of water treated by the settling tank; these extracted materials, laden with sludge coating the microsand, must be treated so as to regenerate the sand; the cleaned sand is subsequently reinjected upstream of the flocculator, at the front of the plant. The residue generated by this sand-ballast cleaning operation represents the excess sludge.

It will be noted that the existing ballast-type apparatus described in the literature, and especially in FR-P-1,411,792 and in FR-A-2,627,704, include a ballast-recycling step for obvious running-cost reasons. Moreover, in all the documents describing this technology it is specified that the ballast is always "cleaned", i.e. regenerated. This is because, the ballast, "coated" with the polymer, must have the maximum area of adhesion for the precipitation flocs produced chemically during coagulation. An effective physical cleaning is therefore indispensable for maximizing the binding area available.

The ballast is often sand, generally having a diameter of between 50 $\mu$m and 150 $\mu$m, usually called microsand.

The publication Journal Water SRT-AQUA, Vol. 41, No. 1, pp. 18–27, 1992 describes a curve relating the turbidity of the water produced to the diameter of the ballast particles, which demonstrates that this process becomes effective when the sand particles do not exceed 150 μm, the results being even better with values of the order of 50 to 100 μm.

It should be pointed out that the advantage of this technique of flocculation using a contacting mass consisting of a fine ballast essentially resides in the settling velocity, which may be from 20% to 200% greater than the velocities obtained by the flocculation processes using a contacting mass consisting of recirculated presettled sludge. Thus, when clarifying river water, the indicated velocities through the lamellar modules are between 25 and 50 m$^3$/m$^2$.h, while the equipment implementing the flocculation process using sludge as the contacting mass is limited to velocities of between approximately 15 and 30 m$^3$/m$^2$.h.

The essential drawbacks of this technique mainly stem from the fact that the ballast must provide two different functions:

accelerated flocculation, by virtue of the use of a contacting mass having a high specific surface area (or spatial occupation);

increase in the settling velocities, resulting from the addition of ballast to the floc.

These limitations or drawbacks can be imputed to the following characteristics:

for equivalent contacting mass (by weight), the ballast offers a contacting surface area or percentage of spatial occupation which is much less than the sludge. By way of example:

in the case of "flocculation with sludge", the concentration in the reactor is approximately 1 g/l and the volume occupied by the sludge after five minutes of settling is approximately 10% of the initial volume;

in the case of "flocculation with ballast (for example sand)", the ballast concentration in the reactor should reach at least 5 g/l, while the volume occupied by sludge after five minutes of settling is only approximately 1% of the initial volume;

increasing the amount of ballast, desirable for obtaining a high contacting mass (and not for obtaining a high settling velocity), leads to an increase in the volume of sludge recirculated to the extracted-sludge treatment system, which treatment consists in separating the sludge from the sand so as to regenerate the latter. This operation is generally carried out by hydrocyclones supplied at high pressures, which operation therefore becomes very expensive from an energy consumption standpoint. In fact, and so as to limit the running costs, the volume of recirculated sludge is intentionally limited to between 5 and 10% of the volume treated and the ballast concentration in the reactor does not exceed 5 to 10 g/l: quite obviously this choice is incompatible with the possibility of optimizing the flocculation.

various techniques are aimed at compensating for the deficit in the contacting mass resulting from the operating conditions described above, such as:

the use of additional flocculation energy (figures ranging up to 100 times the conventional flocculation energy may be mentioned) or the use of even finer ballast particles, increasing the specific surface area (for example, particles having a diameter of between 10 and 50 μm), is not conceivable, on the one hand, for energy cost reasons and, on the other hand, for reasons of difficulty in settling and in sand-floc separation.

In summary, the performance characteristics of flocculation with ballast are limited by three factors:

the system is sensitive to sudden pollution caused by lack of availability of binding sites on the ballast (the contacting mass is limited to a maximum of 5–10 g/l);

the system has a lower performance with regard to so-called "sensitive" pollutants (helminth eggs, microorganisms, microparticles, traces of complex organic compounds, pesticides etc.);

the low concentration of extracted sludge, resulting from the need to clean the ballast as fully as possible—this concentration is at least 10 times lower than that measured on apparatus using a sludge contacting mass—and frequently involving the installation of a complementary unit, downstream of the settling tank, for thickening the extracted sludge.

BRIEF DESCRIPTION OF THE INVENTION

In view of the drawbacks and limitations of the conventional processes mentioned above, the aim of the invention is to provide a novel process making it possible to combine the advantages of the efficiency of flocculation employing a contacting mass consisting of densified recirculated sludge with the high settling rates of a flocculation process using ballast.

Consequently, this invention relates to a process for the physico-chemical treatment of effluent, especially of surface water intended for consumption, comprising the successive steps of coagulation, flocculation and settling, characterized in that, during the flocculation step, a ballast is introduced into the sludge, the function of which ballast is to make the sludge heavier, and in that the contacting mass used during this flocculation step consists of part of the densified sludge resulting from the settling step and continuously recycled in the flocculation step, without a washing operation.

Thus, the process according to the invention employs a ballast, but it is used differently from that in the so-called "flocculation with ballast" process described above. According to the invention, the ballast has only one role, that of ladening, and the flocculation function of the contacting mass is performed just by the recirculated sludge. The ballast no longer constitutes a surface for adhesion, offered to the particles, but simply constitutes a ladening mass which becomes incorporated into the sludge recirculated to the flocculation reactor, this recirculated sludge constituting the contacting mass.

According to one characteristic of the present invention, the ballast consists of a material having a particle size of between 50 and 500 μm, preferably between 100 and 300 μm.

According to a preferred embodiment of the invention, this ballast is a dense inorganic material (actual particle density between 2 and 8 g/ml), especially sand, garnet or magnetite.

According to the present invention, the excess, densified sludge, which is not recycled, may be discharged without treatment or else may be treated so as to recover the ballast, this treatment not including a thorough cleaning of the ballast separated from the sludge. In the case of discharge without treatment, the densified sludge exhibits superior settling capability.

According to the invention, the ballast is preferably recovered by gravity sedimentation, either inside or outside the settling tank, the recovered ballast then being recycled in the flocculation step.

Other features and advantages of the present invention will emerge from the description given below with reference to the appended drawing which illustrates one example of implementation, this being devoid of any limiting character.

In the drawings:

DETAILED DESCRIPTION

Figure 1:
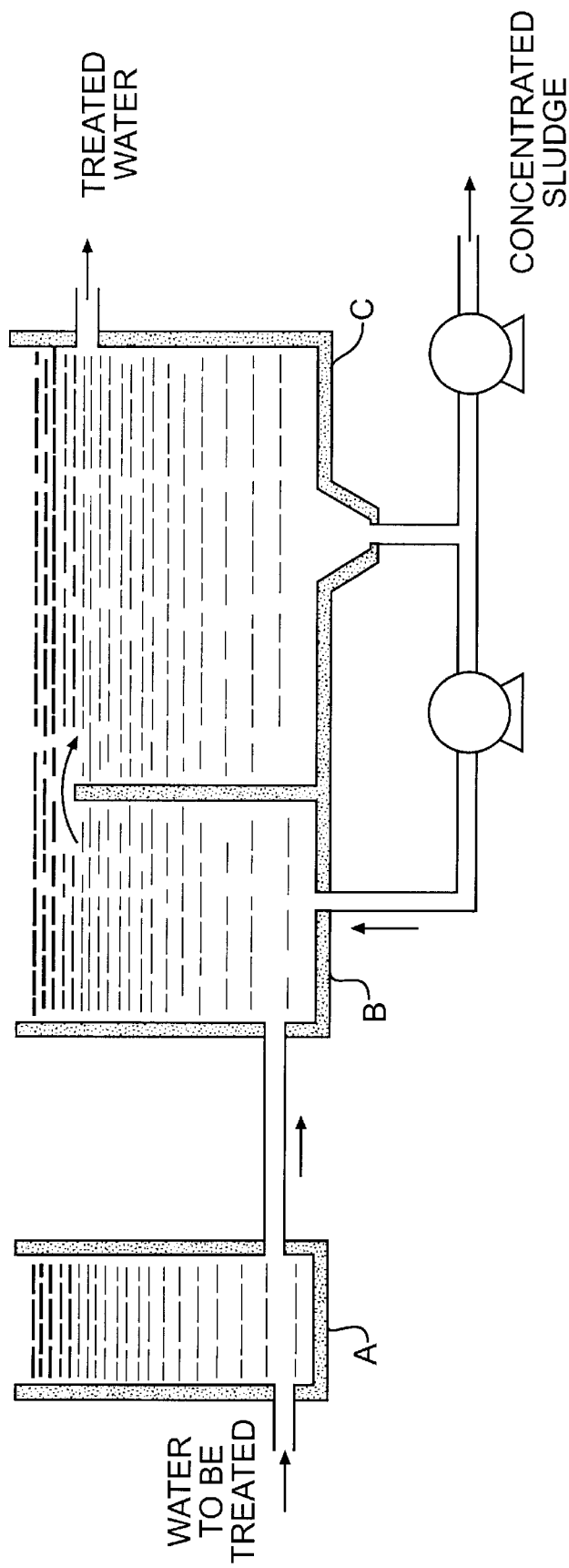
FIG. 1 is a diagram illustrating the principle relating to the known physico-chemical treatment process described above, in which the contacting mass consists of recirculated presettled sludge.
Figure 2:
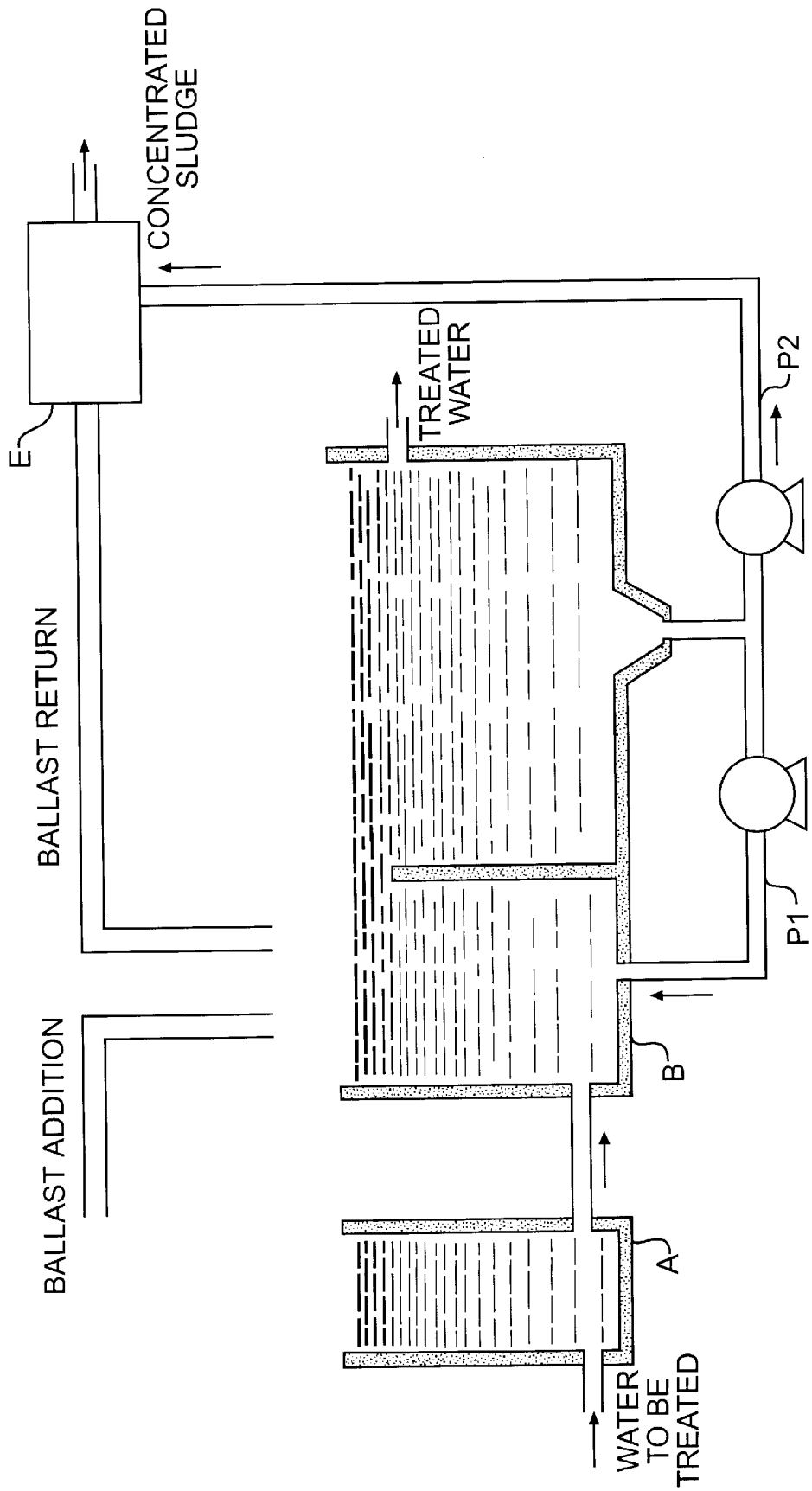
FIG. 2 is a diagram, similar to FIG. 1, illustrating the principle of the process which forms the subject of the present invention.

As may be seen in this FIG. 2, the contacting mass in the flocculator B consists of the continuous recirculation of part P1 of the densified sludge, after settling and thickening in the settling tank C, but without any separation or regeneration operation. According to a preferred method of implementation of this process, the recirculated volume represents between 0.5% and 4% of the treated volume.

A fraction P2 of the sludge, densified in excess, must obviously be removed, for example with a purge volume of between 0.1% (clarification) and 1% (waste water with a very high content of suspended matter) of the treated volume of water. At this stage, two comments should be made:

depending on the level of purge and the cost of the ballast, the excess sludge may be either purely and simply discharged, or treated in order to recover the ballast.

sludge treatment, for recovering the sand, is different from that of the ballast-induced flocculation (FR-P-1,411, 792 and FR-A-2,627,704). This is because, according to the invention, the sand is recovered without being cleaned, i.e. without regeneration, and the treatment is performed on concentrated sludge since it is not necessary to clean the sand thoroughly in the separation phase.

Shown diagrammatically at E in FIG. 2 are the means provided according to the invention for recovering the ballast. It will be noted that the low volume of sludge to be extracted, 0.1% to 1% of the water volume treated (i.e. from 5 to 50 times less than in the case of flocculation with ballast), makes it possible, optionally, to use separation techniques which are more sophisticated and have a higher performance, among which may be mentioned, in particular:

separation by hydrocyclone,
separation by blowing air,
separation by elutriation,
separation by centrifuging,
separation by ultrasound, or to reduce the energy cost of this separation station.

Given that the ballast merely has a simple ladening role and does not have the function of a contacting mass, the size of the particles of this ladening ballast, con- trary to the case of ballast-induced flocculation, may advantageously be chosen towards larger diameters. Thus, it is possible to use weighting particles having a diameter of between 50 and 500 $\mu$m and preferably between 150 and 300 $\mu$m, while in the case of flocculation using a contacting mass consisting of a ballast, the particle size of the latter must be less than 150 $\mu$m and preferably between 50 and 100 $\mu$m.

This ballast diameter, in the process which forms the subject of the invention, constitutes a fundamental characteristic in order to:

increase the settling velocities (if d=100 $\mu$m, the ballast settling velocity=30 m/h, while if d=250 $\mu$m, the ballast settling velocity=115 m/h);

recover the ballast from the extracted sludge.

It will be noted that, in some cases, if the ballast diameter is large enough, simple gravity separation, inside or outside the settling tank, may be envisaged in order to be able to recover and recycle the ballast.

The process according to the invention, with flocculation using a contacting mass consisting of recirculated densified sludge, has in particular the following advantages:

1. It provides a very high percentage of spatial occupation of the binding material, hence the treatment is highly effective:

stability of the purification performance characteristics, even when significantly increasing the charge of raw water;

capability of thorough removal of so-called "sensitive" pollutants (microparticles, micro-organisms, traces of complex organic compounds, pesticides, helminth eggs, etc.).

2. The ballast only has a ladening function. Its average particle size may therefore be greater than that required for ballast-induced flocculation (e.g. 250 $\mu$m as opposed to 100 $\mu$m). This possibility has two advantages:

the settling velocities are considerably increased, this being the more so as the diameter of the ladening material is greater;

recovery of the ballast is all the more easy as its diameter is greater.

In some cases, if its diameter is sufficiently large, it is possible to envisage a simple gravity separation inside or outside the settling tank.

3. The recovered ballast does not need to be cleaned since it is not desired to regenerate "clean" sites for the coagulation/flocculation. Consequently, it is possible, and advantageous, to recover the ballast from highly concentrated sludge, which possibility has the following advantages:

since the extracted sludge is roughly 10 times more concentrated, the volume of the thickener/storage unit installed downstream of the settling tank may be proportionately reduced;

the sand-recovery system operates on smaller volumes in the same proportions (e.g. 10 times smaller) and, here too, the size of the equipment and the energy consumption may be reduced.

4. Separating the flocculation sludge-mass/ballast functions makes it possible to envisage operating with a low throughput (between less than 20% and 80% of Qmax, depending on the case) without adding or recirculating the ballast, thereby making it possible to reduce the running costs even further.

The table below summarizes the comparative performances of the process forming the subject of the present invention and of the processes of the prior act mentioned above. This table refers to these processes being carried out on river water, the treatment volumes being identical for each implementation.

TABLE

| Type of apparatus | Flocculation with sludge | Flocculation with ballast | Flocculation with densified sludge |
|---|---|---|---|
| Velocity in laminar settling modules (m/h) | 25 | 40 | 60 |
| Coagulation and flocculation time (minutes) | 10 | 10 | 10 |
| Ballast: | No | Yes | Yes |
| - diameter | | 50-100 μm | 200 μm |
| - concentration | | 5 g/l | 3 g/l |
| Amount of recirculation (%) | 2 | 7 | 2 |
| Influent SM (in mg/l) | 5 to 70 | 5 to 70 | 5 to 70 |
| Treated water: | | | |
| - turbidity (NTU) | 0.5 to 1 | 1 to 5 | 1 to 2 |
| - SM (mg/l) | <2 | 2 to 10 | 2 to 5 |
| Sludge concentration (g/l) | ≥30 g/l | ≦3 g/l | ≥30 g/l |

Of course, it remains the case that the present invention is not limited to the embodiments described and illustrated, rather it encompasses all alternative forms thereof which fall within the scope of the appended claims.

What is claimed is:

1. A physico-chemical process for treating effluent comprising the steps:

subjecting the effluent to coagulation for forming microflocs;

subjecting the coagulated effluent to flocculation for agglomerating the microflocs into flocs;

subjecting the resulting flocculated effluent to settling for separating flocs and interstitial water components thereby forming sludge and clarified water;

recycling a portion of the sludge to the flocculated effluent during the step of flocculation, the recycled sludge serving as a contact mass for the floc; and adding a ballast to the coagulated effluent during the step of flocculation thereby densifying the sludge, wherein a portion of the densified sludge is recycled, after settling, to the flocculated effluent during the flocculation step without cleaning the ballast, wherein said ballast consists of a material having a particle size of at least about 200 μm, and wherein the volume of densified sludge constituting the contacting mass, which is recirculated, after settling, to said flocculation step, is between 0.5 and 4% of the effluent volume treated.

2. Process according to claim 1, wherein said ballast consists of a material having a particle size of between 200 and 500 μm.

3. Process according to claim 2, wherein said ballast is a dense inorganic material, having an actual particle density between 2 and 8 g/ml.

4. Process according to claim 1, wherein part of the densified sludge is not recycled in the flocculation step and is extracted in the settling step, and represents a purge volume of about 0.1 to 1% of the volume of water treated.

5. Process according to claim 4, wherein the excess, densified sludge, which is not recycled, is discharged without treatment.

6. Process according to claim 4, wherein the excess, densified sludge, which is not recycled, is treated so as to recover the ballast inside or outside a settling tank, said treatment not including a removal of the ballast from the sludge.

7. Process according to claim 6, wherein the ballast is recovered by gravity sedimentation, inside the settling tank, the recovered ballast then being recycled in said flocculation step.

8. Process according to claim 6, wherein the ballast is recovered by gravity sedimentation, outside the settling tank, the recovered ballast then being recycled in said flocculation step.

\* \* \* \* \*